US006468137B1

(12) United States Patent
Fang et al.

(10) Patent No.: US 6,468,137 B1
(45) Date of Patent: Oct. 22, 2002

(54) METHOD FOR POLISHING A MEMORY OR RIGID DISK WITH AN OXIDIZED HALIDE-CONTAINING POLISHING SYSTEM

(75) Inventors: Mingming Fang, Naperville, IL (US); Shumin Wang, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 09/656,665

(22) Filed: Sep. 7, 2000

(51) Int. Cl.$^7$ ................................................ B24B 1/00
(52) U.S. Cl. ........................... 451/41; 451/60; 438/692; 216/88
(58) Field of Search ..................... 451/41, 60; 438/691, 438/692; 216/88, 100; 252/363.5, 79.1; 51/307, 308, 309; 106/3

(56) References Cited

U.S. PATENT DOCUMENTS

| 3,979,239 A | * | 9/1976 | Walsh ............................ 156/4 |
| 4,769,046 A | * | 9/1988 | Senda et al. ................... 51/293 |
| 4,954,141 A | * | 9/1990 | Takiyama et al. ............. 451/60 |
| 5,157,876 A | * | 10/1992 | Medellin ....................... 451/60 |
| 5,230,833 A | * | 7/1993 | Romberger et al. ........ 252/363.5 |
| 5,575,885 A | | 11/1996 | Hirabayashi et al. |
| 5,662,769 A | * | 9/1997 | Schonauer et al. ........... 438/633 |
| 5,770,103 A | | 6/1998 | Wang et al. |
| 5,902,172 A | * | 5/1999 | Utashiro ....................... 451/28 |
| 5,972,792 A | * | 10/1999 | Hudson ....................... 438/691 |
| 6,015,506 A | | 1/2000 | Streinz et al. |
| 6,063,306 A | | 5/2000 | Kaufman et al. |
| 6,290,736 B1 | * | 9/2001 | Evans ........................... 51/307 |

FOREIGN PATENT DOCUMENTS

| EP | 1 020 488 A | 7/2000 |
| WO | WO 99 64527 A | 12/1999 |
| WO | WO 01 36554 A | 5/2001 |
| WO | WO 01 83638 A | 11/2001 |

* cited by examiner

Primary Examiner—George Nguyen

(57) ABSTRACT

A method for planarizing or polishing a substrate, particularly a memory or rigid disk, is provided. The method comprises abrading at least a portion of a surface of a substrate with a polishing system comprising (i) a polishing composition comprising a liquid carrier, at least one oxidized halide, and at least one amino acid, and (ii) a polishing pad and/or an abrasive.

20 Claims, No Drawings

METHOD FOR POLISHING A MEMORY OR RIGID DISK WITH AN OXIDIZED HALIDE-CONTAINING POLISHING SYSTEM

TECHNICAL FIELD OF THE INVENTION

The present invention relates to a method of planarizing or polishing a substrate, particularly a memory or rigid disk.

BACKGROUND OF THE INVENTION

The demand for increased storage capacity in memory or rigid disks and the trend towards miniaturization of memory or rigid disks (due to the requests of computer manufacturers for smaller hard drives) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

In particular, such polishing compositions and/or methods can result in less than desirable polishing rates and high surface defectivity when applied to memory or rigid disks. The performance of a rigid or memory disk is directly associated with its surface quality. Thus, it is crucial that the polishing compositions and methods maximize the polishing or removal rate yet minimize surface defectivity of the memory or rigid disk following planarization or polishing.

There have been many attempts to improve the removal rate of memory or rigid disks during polishing, while minimizing defectivity of the polished surface during planarization or polishing. For example, U.S. Pat. No. 4,769,046 discloses a method for polishing a nickel-plated layer on a rigid disk using a composition comprising aluminum oxide and a polishing accelerator such as nickel nitrate, aluminum nitrate, or mixtures thereof.

There remains a need, however, for improved methods of planarizing or polishing memory or rigid disks at a high removal rate, while minimizing surface defectivity. The present invention seeks to provide such a method. These and other advantages of the present inventive method will be apparent from the description of the invention provided herein.

BRIEF SUMMARY OF THE INVENTION

The invention provides a method for planarizing or polishing a surface of a memory or rigid disk comprising abrading at least a portion of the surface with a polishing system comprising (i) a polishing composition comprising a liquid carrier, at least one oxidized halide, and at least one amino acid, and (ii) a polishing pad and/or an abrasive.

DETAILED DESCRIPTION OF THE INVENTION

The present invention provides a method for planarizing or polishing a surface of a memory or rigid disk comprising abrading at least a portion of the surface with a polishing system comprising (i) a polishing composition comprising a liquid carrier, at least one oxidized halide, and at least one amino acid, and (ii) a polishing pad and/or an abrasive. The abrasive forms part of the polishing composition when present and suspended in the liquid carrier of the polishing composition.

The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material.

The liquid carrier can be any suitable carrier (e.g., solvent). Suitable liquid carriers include, for example, aqueous carriers (e.g., water) and non-aqueous carriers. Preferably, the liquid carrier is water.

A surface of the memory or rigid disk can be planarized or polished with the polishing system with any suitable polishing pad (e.g., polishing surface) and/or abrasive. It is suitable, for example, for the polishing system to comprise a polishing pad (e.g., an abrasive pad or a non-abrasive pad) and/or an abrasive that is suspended in the liquid carrier of the polishing composition. Moreover, it is suitable for the polishing system to comprise a polishing pad (e.g., an abrasive pad or a non-abrasive pad) when no abrasive is suspended in the liquid carrier of the polishing composition.

Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, and coformed products thereof, and mixtures thereof. As discussed above, the abrasive of the polishing system can be fixed (e.g., embedded) in whole or in part, in or on the polishing pad such fixation on the polishing pad can be accomplished, for example, by blending the abrasive material, e.g., abrasive particles, into the aforementioned polymers during the formation of the polishing pad.

The abrasive of the polishing system can be any suitable abrasive. The abrasive desirably is in the form of particles and desirably is a metal oxide, e.g., metal oxide particles. Metal oxide abrasives include, for example, alumina, silica, titania, ceria, zirconia, germania, magnesia, coformed products thereof, and mixtures thereof. Preferably, the abrasive of the polishing system is a condensation-polymerized metal oxide, e.g., condensation-polymerized silica particles. Condensation-polymerized silica particles typically are prepared by condensing $Si(OH)_4$ to form colloidal particles. Such abrasive particles can be prepared in accordance with U.S. Pat. No. 5,230,833 or can be obtained as any of various commercially available products, such as the Akzo-Nobel Bindzil 50/80 product and the Nalco 1050, 2327, and 2329 products, as well as other similar products available from DuPont, Bayer, Applied Research, Nissan Chemical, and Clariant.

It should be understood that the polishing or planarization of a memory or rigid disk can involve two or more distinct polishing steps, utilizing different polishing systems, or alternatively utilizing substantially similar, or even the same, polishing systems. It is suitable, for example, to utilize in a first polishing step a "coarse" polishing system comprising abrasive particles with a particle size greater than 100 nm, and to utilize in a second polishing step a "fine" polishing system comprising abrasive particles with a particle size less than 100 nm. The abrasive particles of the polishing system of the present invention desirably are such that about 90% or more of the abrasive particles (by number) have a particle size no greater than 100 nm. Preferably, the abrasive particles are such that at least about 95%, 98%, or even substantially all (or actually all) of the abrasive particles (by number) have a particle size no greater than 100 nm. These particle size preferences for the abrasive particles (i.e., whereby at least about 90%, 95%, 98%, substantially all, and all of the abrasive particles (by number) are no greater than a specific size of abrasive particle) also can pertain to other particle sizes, such as 95 nm, 90 nm, 85 nm, 80 nm, 75 nm, 70 nm, and 65 nm.

Similarly, the abrasive can be such that at least about 90%, 95%, 98%, or even substantially all (or actually all) of the abrasive particles (by number) have a particle size no less than 5 nm. These particle size preferences for the abrasive particles (i.e., whereby at least about 90%, 95%, 98%, substantially all, and all of the abrasive particles (by number) are no less than a specific size of abrasive particle) also can pertain to other particle sizes, such as 7 nm, 10 nm, 15 nm, 25 nm, and 30 nm.

The percentage values used herein to describe the nature of the abrasive in terms of particle size are percentages "by number," rather than being weight percentages, unless otherwise noted. The particle size of the abrasive refers to the particle diameter. The particle size can be measured by any suitable technique. The particle size values set forth herein are based on a visual inspection, specifically by way of transmission electron micrography (TEM), of a statistically significant sample of the abrasive particles, preferably at least 200 particles.

Any suitable amount of the abrasive can be present in the polishing system, generally in the form of abrasive particles suspended in the liquid carrier of the polishing composition. Preferably, the abrasive particles are present in a concentration of about 0.1 wt. % or more, e.g., 0.1–30 wt. % of the polishing composition, or even about 1–28 wt. % of the polishing composition. More preferably, the abrasive particles are present in a concentration of about 2–25 wt. % of the polishing composition, e.g., about 4–20 wt. % of the polishing composition, or even about 6–15 wt. % of the polishing composition.

The at least one oxidized halide of the polishing system can be any suitable oxidized halide. Suitable oxidized halides include, for example, chlorates, bromates, iodates, fluorates, perchlorates, perbromates, periodates, mixtures thereof, acids thereof, and the like. Preferred oxidized halides include, for example, potassium halides, sodium halides, cesium halides, and ammonium halides, e.g., potassium iodate, potassium bromate, potassium chlorate, sodium iodate, sodium bromate, sodium chlorate, cesium iodate, cesium bromate, cesium chlorate, ammonium iodate, ammonium bromate, and ammonium chlorate. Most preferably, at least one oxidized halide is an iodate, periodate, or acids thereof, or a mixture thereof, such as, for example, potassium iodate.

Any suitable amount of the at least one oxidized halide can be present in the polishing composition. The at least one oxidized halide desirably is present in an amount of about 0.01–20 wt. %, e.g., about 0.05–20 wt. %., about 0.05–15 wt. %, or even about 0. 1–10 wt. % of the polishing composition. More preferably, the at least one oxidized halide is present in an amount of about 0.1–8 wt. % of the polishing composition, e.g., about 0.5–6 wt. %, about 1–5 wt. %, or even about 1–3 wt. %.

The at least one amino acid of the polishing system can be any suitable amino acid. Suitable amino acids include, for example, amino acids containing 1–8 carbon atoms, e.g., amino acids containing 1–7 carbon atoms, or even amino acids containing 1–6 carbon atoms. Preferably, at least one amino acid of the composition of the present inventive method is glycine, iminodiacetic acid, alanine, valine, leucine, isoleucine, serine, and threonine. More preferably, at least one amino acid is glycine or alanine.

Any suitable amount of the at least one amino acid can be present in the polishing composition. The at least one amino acid desirably is present in an amount of about 0.01–20 wt. %, e.g., about 0.1–15 wt. %, or about 0.1–10 wt. % of the polishing composition. More preferably, the at least one complexing agent is present in an amount of about 0.1–8 wt. % of the polishing composition, e.g., about 0.25–6 wt. %, about 0.25–5 wt. %, or even about 0.5–3 wt. %.

The pH of the polishing composition can be any suitable pH. Preferably, the pH of the composition is about 1–7, e.g., about 1–6. More preferably, the pH of the composition is about 2–5, e.g., about 2–4, or even about 3–4.

The pH of the polishing system can be adjusted, if necessary, in any suitable manner, e.g., by adding a pH adjuster to the polishing system. Suitable pH adjusters include, for example, bases such as potassium hydroxide, ammonium hydroxide, sodium carbonate, and mixtures thereof, as well as acids such as mineral acids (e.g., nitric acid and sulfuric acid) and organic acids (e.g., acetic acid, citric acid, malonic acid, succinic acid, tartaric acid, and oxalic acid).

The polishing composition optionally can further comprise one or more other additives. Such additives include surfactants (e.g., cationic surfactants, anionic surfactants, nonionic surfactants, amphoteric surfactants, fluorinated surfactants, and mixtures thereof), polymeric stabilizers or other surface active dispersing agents (e.g., phosphoric acid, organic acids, tin oxides, and phosphonate compounds), and additional polishing accelerators such as catalysts and chelating or complexing agents (e.g., metal, particularly ferric, sulfates, compounds with carboxylate, hydroxyl, sulfonic, and/or phosphonic groups, di-, tri-, multi-, and poly-carboxylic acids and salts (such as tartaric acids and tartrates, malic acid and malates, malonic acid and malonates, gluconic acid and gluconates, citric acid and citrates, phthalic acid and phthalates, pyrocatecol, pyrogallol, gallic acid and gallates, tannic acid and tannates), amine-containing compounds (such as primary, secondary, tertiary, and quaternary amines), and mixtures thereof).

A surface of the memory or rigid disk can be planarized or polished with the polishing system of the present invention by any suitable technique. In this regard, it is suitable for the polishing composition to be formulated (e.g., the components thereof mixed together) prior to delivery to the polishing pad or to the surface of the substrate. It is also suitable for the polishing composition to be formulated on the surface of the polishing pad or on the surface of the substrate, through delivery of the components of the polishing composition from two or more distinct sources, whereby the components of the polishing composition meet at the surface of the polishing pad or at the surface of the substrate. In this regard, the flow rate at which the components of the polishing composition are delivered to the polishing pad or to the surface of the substrate (i.e., the delivered amount of the particular components of the polishing composition) can be altered prior to the polishing process and/or during the polishing process. Moreover, it is suitable for the particular components of the polishing composition being delivered from two or more distinct sources to have different pH values, or alternatively to have substantially similar, or even equal, pH values, prior to delivery to the surface of the polishing pad or to the surface of the substrate. It is also suitable for the particular components being delivered from two or more distinct sources to be filtered either independently or to be filtered jointly (e.g., together) prior to delivery to the surface of the polishing pad or to the surface of the substrate.

The viscosity of the polishing system can be adjusted by altering the concentrations of the particular components of the polishing system. The viscosity of the polishing system also can be adjusted through the addition to the polishing system of any suitable rheological control agent (i.e., a polymeric Theological control agent). Suitable Theological control agents include, for example, urethane polymers (e.g., urethane polymers with a molecular weight greater than about 100,000 Daltons), and acrylates comprising one or more acrylic subunits (e.g., vinyl acrylates and styrene acrylates), and polymers, copolymers, and oligomers thereof, and salts thereof.

The following example further illustrates the present invention but, of course, should not be construed as in any way limiting its scope.

EXAMPLE

This example illustrates that the polishing rate of a memory or rigid disk achievable by the present inventive method is dependent on the presence of an amino acid in conjunction with an oxidized halide in the polishing system.

Nickel-phosphor plated memory or rigid disks (obtained from Seagate Technology) were polished separately with two different polishing systems (designated Systems 1A and 1B) with 4 wt. % silica (specifically, Akzo-Nobel Bindzil 50/80 product), 2 wt. % oxidized halide (specifically, potassium iodate ($KIO_3$)), and 1 wt. % amino acid (specifically, glycine or DL-alanine), wherein both of the polishing systems had a pH of 2.5. For comparison purposes, nickel-phosphor plated memory or rigid disks also were polished with a control polishing system with 4 wt. % silica (specifically, Akzo-Nobel Bindzil 50/80 product) and 0.25 wt. % hydroxylamine nitrate (HAN), wherein the control system had a pH of 3.5, and with a "comparative" polishing system with 4 wt. % silica (specifically, Akzo-Nobel Bindzil 50/80 product) and 2 wt. % oxidized halide (specifically, $KIO_3$, wherein the comparison system had a pH of 2.5. The memory or rigid disks were nickel-phosphor coated (plated) disks with aluminum substrates that had undergone a pre-polishing process prior to being used, such that each memory or rigid disk had a surface roughness of 10–50 Å. The memory or rigid disks were polished using a table top polishing machine manufactured by Streuers (West Lake, Ohio) with a platen speed of 150 rpm, a polishing carrier speed of 150 rpm, a slurry flow rate of 100 ml/min, and a polishing downforce of 50 N. The polishing pads used for each substrate were 25.4 cm diameter Politex Hi pads manufactured by Rodel.

Following use of the polishing systems, the nickel-phosphor polishing rate of each system was determined by weighing the clean, dry memory or rigid disk prior to polishing and following polishing. The weight loss was converted to a memory or rigid disk thickness loss using a nickel-phosphor density of 8.05 g/cm³. The actual polishing rate of each test system was then converted to a relative polishing rate by dividing the polishing rate of the test system by the polishing rate of the most recently evaluated control system, with the resulting data set forth in Table 1.

TABLE 1

| System | $KIO_3$ (Wt. %) | Complexing Agent | Relative Polishing Rate |
|---|---|---|---|
| Control | None | HAN | 1.0 |
| Comparative | 2 | None | 2.1 |
| 1A | 2 | 1 wt. % Glycine | 2.5 |
| 1B | 2 | 1 wt. % DL-Alanine | 2.5 |

As is apparent from the data set forth in Table 1, the relative polishing rates exhibited by polishing systems containing both $KIO_3$ and amino acids (Systems 1A and 1B) were greater than the relative polishing rates of the control polishing system and of the comparative system that did not contain both $KIO_3$ and an amino acid. These results demonstrate the significance of the combination of an oxidized halide and an amino acid in the context of the present inventive method on the polishing rate achievable by the present inventive method.

All of the references cited herein, including patents, patent applications, and publications, are hereby incorporated in their entireties by reference.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims.

What is claimed is:

1. A method for planarizing or polishing a surface of a memory or rigid disk comprising:
    (a) providing a polishing system comprising (i) a polishing composition comprising a liquid carrier, at least one oxidized halide, and at least one amino acid, and (ii) a polishing pad, an abrasive, or a combination thereof,
    (b) contacting at least a portion of the surface of a memory or rigid disk with the polishing system, and
    (c) abrading at least a portion of the surface of the memory or rigid disk with the polishing system to polish the memory or rigid disk.

2. The method of claim 1, wherein the surface of the memory or rigid disk comprises nickel-phosphorus.

3. The method of claim 1, wherein the liquid carrier is a nonaqueous solvent.

4. The method of claim 1, wherein the liquid carrier is water.

5. The method of claim 3, wherein the abrasive is suspended in the liquid carrier of the polishing composition.

6. The method of claim 5, wherein the abrasive is suspended in the liquid carrier of the polishing composition in a concentration of about 0.1–30 wt. %.

7. The method of claim 1, wherein the abrasive is fixed on the polishing pad.

8. The method of claim 1, wherein no abrasive is present in the system, and the polishing pad is a non-abrasive pad.

9. The method of claim 1, wherein the abrasive comprises a metal oxide selected from the group consisting of alumina, silica, titania, ceria, zirconia, germania, magnesia, coformed products thereof, and mixtures thereof.

10. The method of claim 9, wherein the abrasive is silica particles.

11. The method of claim 3, wherein the oxidized halide is an iodate, periodate, or acids thereof, or a mixture thereof.

12. The method of claim 11, wherein the oxidized halide is potassium iodate.

13. The method of claim 3, wherein the oxidized halide is present in the polishing composition in an amount of about 0.01–20 wt. %.

14. The method of claim 3, wherein the amino acid is selected from the group consisting of glycine, iminodiacetic acid, alanine, valine, leucine, isoleucine, serine, and threonine.

15. The method of claim 14, wherein the amino acid is glycine.

16. The method of claim 14, wherein the amino acid is alanine.

17. The method of claim 3, wherein the amino acid is present in the polishing composition in an amount of about 0.01–20 wt. %.

18. The method of claim 3, wherein the polishing system has a pH of about 1–7.

19. The method of claim 3, wherein the polishing composition comprises 0.01–20 wt. % iodate or an acid thereof and 0.01–20 wt. % glycine or alanine, and wherein the polishing composition has a pH of 1–7.

20. The method of claim 19, wherein the polishing composition comprises 0.1–10 wt. % potassium iodate and 0.1–10 wt. % glycine, and wherein the polishing composition has a pH of 2–5.

* * * * *